(12) United States Patent
Lin (10) Patent No.: US 11,681,205 B2
(45) Date of Patent: Jun. 20, 2023

(54) VERSATILE VOLUMETRIC VIDEO CAMERA RIG

(71) Applicant: Radiant Images Inc., Los Angeles, CA (US)

(72) Inventor: Weijan Lin, Los Angeles, CA (US)

(73) Assignee: Radiant Images Inc., Los Angeles, CA (US)

( * ) Notice: Subject to any disclaimer, the term of this patent is extended or adjusted under 35 U.S.C. 154(b) by 562 days.

(21) Appl. No.: 16/815,995

(22) Filed: Mar. 11, 2020

(65) Prior Publication Data

US 2020/0292920 A1 Sep. 17, 2020

Related U.S. Application Data

(60) Provisional application No. 62/816,775, filed on Mar. 11, 2019.

(51) Int. Cl.
*G03B 17/56* (2021.01)
*F16M 13/02* (2006.01)
*F16M 11/22* (2006.01)

(52) U.S. Cl.
CPC ........... *G03B 17/561* (2013.01); *F16M 11/22* (2013.01); *F16M 13/02* (2013.01)

(58) Field of Classification Search
CPC ...... G03B 17/56; G03B 17/561; F16M 11/20; F16M 11/2085; F16M 11/2092; F16M 11/22; F16M 13/00; F16M 13/005; F16M 13/02; F16M 13/022; G01C 11/00; G01C 11/02; G01C 11/025; G01C 11/36
See application file for complete search history.

(56) References Cited

U.S. PATENT DOCUMENTS

2006/0058158 A1* 3/2006 McAvoy ................. A63B 23/12
482/148
2019/0063918 A1* 2/2019 Hart ..................... H04N 13/243

FOREIGN PATENT DOCUMENTS

WO WO-2018096116 A1 * 5/2018 ........... G01B 11/245

* cited by examiner

*Primary Examiner* — Roy Y Yi
*Assistant Examiner* — Fang-Chi Chang
(74) *Attorney, Agent, or Firm* — Socal IP Law Group LLP; Jonathan Pearce (57) ABSTRACT

There is disclosed a versatile volumetric camera rig composed of a partially spherical structure formed by the combination of a plurality of substructures. The substructure may be made from a plurality of arm components and joint components which may be further outfitted with cameras and other sensors that capture a scene from within the rig.

14 Claims, 11 Drawing Sheets

© 2020 Radiant Images Inc.

VERSATILE VOLUMETRIC VIDEO CAMERA RIG

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from provisional patent application 62/816,775, filed Mar. 11, 2019, titled VERSATILE VOLUMETRIC VIDEO CAMERA RIG.

BACKGROUND

Field

This disclosure relates to a structure used in filming, and more specifically a structure suitable for mounting cameras, lighting, and other components used in filming for capturing traditional two-dimensional video, as well as augmented reality content, virtual reality content, and so-called volumetric video.

Description of the Related Art

Filming has undergone many changes. With the popularity of AR and VR technologies, as well as more availability of high quality digital cameras, filmmakers are able to use more cameras to create more immersive experiences. Simultaneously, consumers want new experiences that they have been unable to take part in previously. The rise of relatively-inexpensive virtual reality headsets such as the Oculus® Quest have made viewing content that is filmed or created with more than a single viewing angle in mind much more accessible. In response, filmmakers and content creators have begun creating more immersive experiences by filming real-life scenes using multiple cameras from different angles simultaneously and by embedding cameras within a given scene. Similarly, non-traditional cameras or camera-like devices may be used, such as light field projectors or LIDAR to capture depth information or other information that may be used to create volumetric video including both visual and geometric data (e.g. depth and shape).

One example of immersive filming is so-called 360° filming. The resulting 360° video content is generally created by a computer by stitching a number of images with limited fields of view, but captured simultaneously, together to form an entire sphere of still or video images in which an individual can stand. It is most easily viewed by an individual with a VR headset, but can also be viewed by other methods. For example, a user may view such content by moving his or her mobile phone about while looking at a viewing application. In this way, the phone acts as a "window" through which the 360° video may be viewed. As the phone is moved around, the scene is shown as if it is "behind" the camera. The viewer may view different portions of the 360° video by moving the phone.

These types of videos can be very immersive and invoke a strong sense of presence, however the individual perspective in scenes are without fail fixed relative to the images themselves. So, a viewer may only view such scenes from a position selected by a filmmaker. This has obvious advantages in creating sets, setting a scene, and otherwise limiting the field of view to a user. Those advantages may be helpful to a storyteller. However, it also restricts movement within the scene. Viewers can look around in all directions, but they cannot move from the physical camera's position. Additionally, conventional 360° video content sacrifices depth and volume content, because it is effectively a sphere with a viewer at the center and pictures posted along the interior walls of that sphere. There are no objects within the scene that have a shape other than this spherical wall or that a viewer may look around or near. This further reduces how immersive the experience is by restricting the viewer's experience.

With volumetric and light-field techniques, the volumetric video may be captured.

Volumetric video is distinguished from 360° video in that the volumetric video uses photogrammetry or depth of field sensors (e.g. light field arrays, LIDAR) to capture depth information as well. This information results in volumetric video capturing both the images of the scene and overall three-dimensional parameters of objects in the scene. So, for example, a chair within a given volumetric video scene may have both a shape (e.g. a three-dimensional geometric shape corresponding to that of the chair) and images superimposed thereover to create the impression that it is made of wood, or metal, or plastic, or whatever the case may be. Therefore, in volumetric video, a viewer can generally freely move within the scene, overcoming movement restrictions of conventional two-dimensional or 360° video filming techniques. Content produced using these techniques is often referred to as volumetric, 6DoF, light-field, or free-viewpoint video.

In a volumetric video, the distance to at least some points within the scene is captured in addition to image data. Using photogrammetry, this depth information may be extrapolated into reasonable three-dimensional models of the surrounding space (or enclosed space, depending on the capture methods). Using this information, the 3D geometry of the scene can be reconstructed into a navigable space. For example, if a boxing match were captured with a volumetric video system, a viewer could choose to enter the ring and view the fight as though they were the referee or one of the fighters or see it from any side at any point in the fight. Importantly, a viewer could stand behind a boxer (or the actual referee) and portions of the ring and the other boxer may be partially or fully occluded from view because the three-dimensional model of the boxer the viewer is standing behind would be blocking the view of the other boxer. In most 360° filming techniques a viewer would only be able to look around from one fixed point and not actually be able to walk around the ring. Thus, the viewer's view is not restricted by the position of a camera, they are allowed to explore the entire environment of the scene that is shot with volumetric filming.

Volumetric video capture typically captures the same scene from multiple points using a plurality of cameras. This may be done with a rig corresponding to a traditional tripod, with cameras facing outward in a plurality of directions. In the simplest rigs, this may only be 4 or 8 cameras, but in more complex setups, the number of cameras may be in the tens or hundreds. Traditional film cameras may be used, but often depth-sensing cameras or other, independent sensors, such as infrared or light field may be employed as well to enable three-dimensional data for the scene to be captured. To do this at scale, the cameras' distance to a focal point must be known, and the cameras should be regularly arranged around a given scene. The regular arrangement standardizes the mathematics involved in recreating both the visual (e.g. captured images) and the three-dimensional aspects of the scene (e.g the depth and shape of objects in the scene). In particular, the regular arrangement (e.g. always at 4 foot distances from one another) enables methods like photogrammetry to be employed to correct or complete depth and three-dimensional shape calculations. More complex volumetric rigs may be large, covering entire studios or large portions of studios for scenes involving multiple actors, automobiles, or similar locations. Most volumetric filming environments still leave a lot to be desired due to the rigidity of filming environment and high cost of creating such environments. It would be helpful if there were some standard volumetric filming environment that enabled highly accurate image and depth information capture that was simultaneously simple to set up and use.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Disclosed is an apparatus comprising a structure that may be used to capture images and depth data for the creation of volumetric, 6DoF and light-field video that may include freedom of movement for a viewer of that video. This apparatus vastly reduces the cost and lead times for creating and setting up a rig for volumetric video filming while maintaining the highest quality and accuracy by utilizing uniform structures. The structures may be created using molds, die casting, or milling techniques to enable an efficient manufacturing process. The apparatus includes arm components, joint components and stands that may be joined into a full structure to encapsulate an area in a nearly-complete semi-sphere. The arm components are configured to hold cameras and other apparatuses in virtually any position as discussed below, as well as hold fiducial markers such as dots, QR codes, lights, uniform holes, or other components that aid in the calibration of cameras or combined camera rigs. When assembled, the arm components and joint components create a structure that can be used to film a 360° filming scene or for capturing volumetric video.

Volumetric and light-field video is regarded worldwide as an important development; especially in the context of rapidly evolving virtual and augmented reality markets. Volumetric video is becoming a key technology for media giants such as Sony®, who has dominated distribution in most key entertainment platforms from film to music and gaming, as well as many other traditional media giants and new media creators. Many expect volumetric video to become one of the primary mediums of artistic expression over the next several years in much the same way that traditional two-dimensional film became its own artistic medium over the early 20th century. Performance capture in volumetric video will also be useful for a variety of applications including education, medical training, e-commerce, and entertainment videos. The increasing popularity of VR/AR technologies increases the need for uniform, simple, but capable volumetric capture.

Preferred capture solutions, that result in high-quality volumetric video, use a large number of cameras. The captured images are then reconstructed from highly sparse views; which can be technologically challenging as large regions of a captured object or captured human body are often occluded or not observed by multiple cameras. These systems often use a pre-scanned subject-specific templates to reproduce those objects or bodies, but using such methods, unnatural details endemic to the underling template such as fine features on faces, hands, hair, and clothing may be incorrect or otherwise appear wrong in resulting volumetric video. Still, these methods can speed up capture or aid in accurate reconstruction of volumetric video after it is captured.

For example, surfaces with concavities are difficult to model, and the resulting geometries are often rough when a very sparse number of cameras are used. Specifically, if only a few cameras catch a given concavity on an object, then computer algorithms for capture and recreation of volumetric video may not detect the concavity and may be unable to recreate it in the resulting volumetric video. This is because prior methods of filming fail to appreciate that a uniform film capture structure in which the cameras are arranged in a shape that closely mirrors a sphere as much as possible are best suited to the capture of volumetric video. The resulting, high-density video capture, with much of camera's field of view overlapping with one or more other camera's fields of view results in volumetric video that is uniform, accurate, and lacks artifacts such as jagged edges or strange stretched portions of the images.

Most prior systems rely upon arm components that are straight lines between joint components. As a result, the overall structures take a form similar to lighting rigs for stage or film production, or are effectively cubes or rectangular structures. As a result, the cameras are, by operation of simple geometry, at varying distances from the objects or actors being captured and have varying levels of overlap between the camera fields of view. These types of structures are certainly easier to construct, but they introduce unusual mathematics into the scene (e.g. certain cameras slightly-closer than other cameras to the same subject) and as a result introduce artifacts or other oddities that must be compensated for by software. The resulting volumetric video is generally of a lower quality than those of the structure disclosed herein.

The disclosed volumetric capture system that solves these issues and allows for a perfect geometry spherical capture. The disclosure is highly adaptive and can be outfitted with many more cameras than the prior art, adding density of cameras anywhere inside the sphere, above and/or below the subject. The design of the disclosure system also dramatically resolves the occlusion issues simply by fully, and uniformly surrounding the subject(s) to be filmed.

The disclosed structure is highly adaptive and an accurate capture system. The structure is designed to be collapsible for easy transport and storage, and may be quickly rebuilt for on-location capture.

The disclosed joint components (discussed below) include hexagonal, pentagonal, octagonal, and other geometric shapes that allow for a near-perfect spherical 360° capture, beyond any system presently available. The disclosure is also camera agnostic, modular in design, and has the highest accuracy and adaptability over prior art systems. Almost any camera that fits within bars and joint components may be used.

The system enables the creation of volumetric video that depicts naturally moving dynamic 3D models, which can then be observed from arbitrary viewpoints in a virtual or augmented reality scene. The capture system consists of an integrated multi-camera and lighting system for full 360° and a truly inward facing spherical acquisition. The full carbon fiber spherical design may be restructured to fit any volume from 2 meter diameter to 8 meter diameter. Though, other volumes may be created using the same general model. The c-channel design for the exterior of the joint components and arm components acts as an integrated cable management system and in some cases a completely toolless installation as well as an extremely lightweight yet rigid structure.

The design supports over 100 cameras in a single rig. One may also add additional cameras anywhere inside the sphere as needed for additional camera density. The disclosure can support virtually any number of LED panels that allow for an arbitrary lit background. Hence, diffuse lighting and automatic keying (e.g. greenscreen) are supported. The avoidance of greenscreen and provision of diffuse lighting (lighting from various angles, and from a distance) offers the best possible conditions for re-lighting of the dynamic 3D models. Specifically, capture of volumetric video using a single lighting source causes shadows that make computer-aided "re-lighting" of a three-dimensional model difficult and often unusual looking. In contrast to other structures and methods, facial expressions and moving clothes are reconstructed at high geometrical detail and texture quality.

Though described with respect primarily to the capture of multi-angle volumetric video reliant upon multiple cameras, the type of data captured may also be or include light field capture, motion capture (e.g. mo-cap), machine vision, or augmented reality capture. The structure may also be used to generate data suitable for use in training artificial intelligence related to machine learning or may operate as merely a light stage for traditional film techniques.

Figure 1:
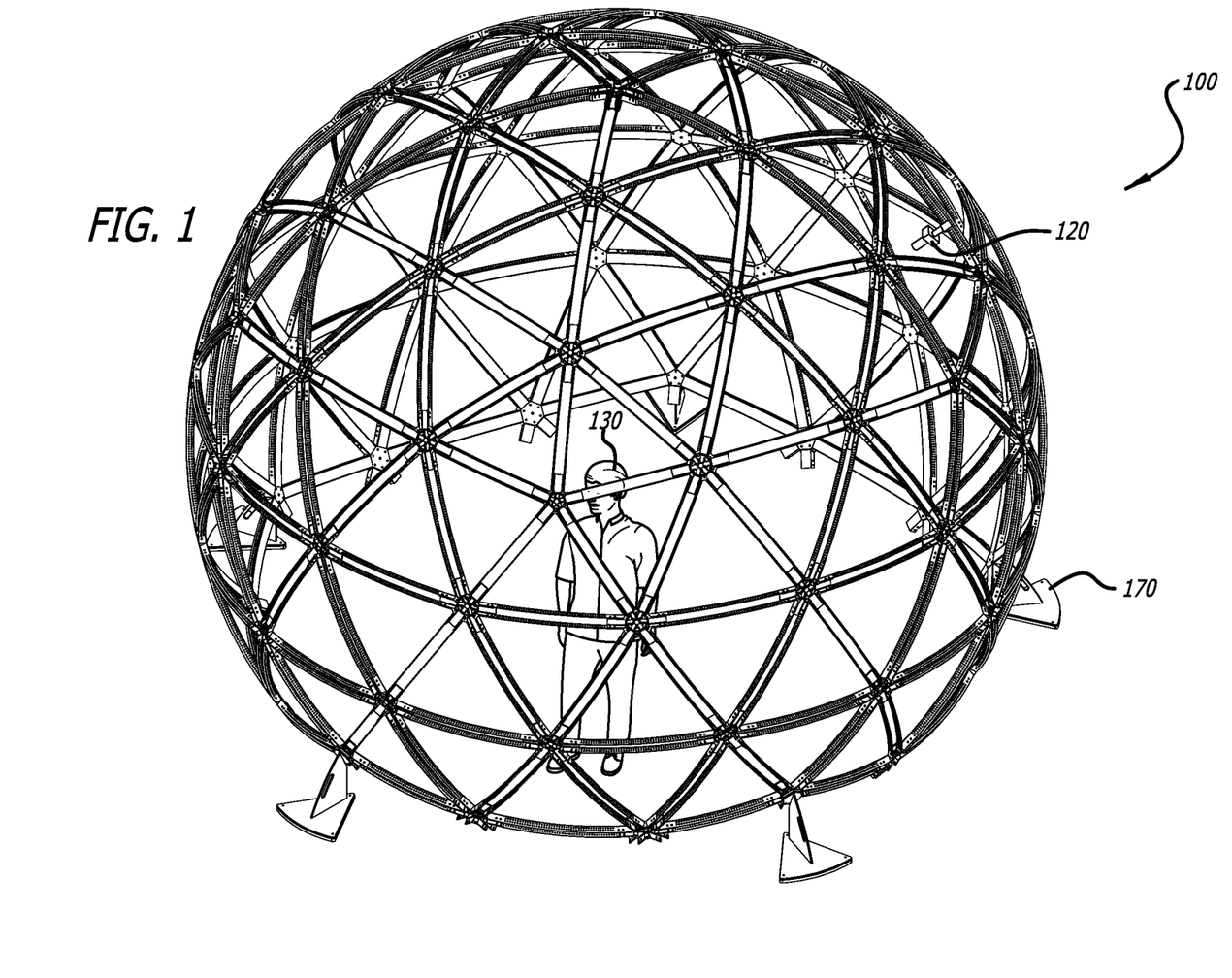
FIG. 1 is a fully constructed versatile volumetric camera rig with an example scene being captured within the rig.

Referring now to FIG. 1 is a fully constructed versatile volumetric camera rig 100 with an example scene being captured within the rig 100.

The rig 100 is composed of a at least partially spherical structure formed by the combination of a plurality of substructures. These substructures are further made from a plurality of arm components and joint components. Fixture 120 may be attached to the arm and joint components for use in filming. As used herein the word "fixture" means a device for capturing or aiding in the capture of an image or other data used in constructing a volumetric video, or other motion or still film or images. Potential fixtures may be cameras, sensors, fog machines, lights, LED panels, and platforms or attachments that are used in filming. Additionally, stand component 170 may be added to the bottom of the rig as a fixture for allowing the entire rig to stand upright. In other instances, stand components 170 may not be used and the rig may be incorporated into a surface or attached to another piece of the environment or a studio. Many fixtures 120 may be incorporated into the rig 100. The rig 100 may include as many fixtures 120 as needed for a particular scene may be used as necessary. For example, if the rig is being used to film a fully immersive 360° scene, then more than one camera may be attached to the rig. In some instances, 10 cameras may be used. In others at least one camera per arm may be attached to the rig. In other instances, a combination of fixtures may be used, such as 10 cameras, 2 fog machines, 4 projectors and 6 lights.

The entire rig may be constructed to be almost any size but in the experience of the inventors a 5000 mm wide and 4097 mm tall rig has been sufficient for most scenes using the rig 100. Additionally, a full semispherical structure need not be constructed, some sub portions of the rig may be left unconstructed. For example, say a scene of a cave or ocean is being filmed, half of the rig may be taken out leaving only a half or other partially spherical structure.

Specifically, for FIG. 1, subject 130 is in the process of being filmed within the rig 100. For this example, subject 130 is a human but could be any object or many objects (e.g. a scene) that may be filmed. For example, for a cereal commercial, one or more actors, as well as a table, plates, bowls, chairs, cereal boxes, and other scenery may be the subject. The subject may be anything a filmmaker wishes to capture when inside the rig 100.

In some instances, subject 130 may be outfitted with fiducial markers or other sensors that correspond and interact with fixtures 120. These fiducial markers may aid in computer tracking of the individual for better generation of a three-dimensional model in post-production of the scene, or may be used to better augment in depth capture as a scene is being captured. If fixture 120 is a motion tracking camera, and a scene requires tracking subject 130, then the camera represented by fixture 120 or the rig 100 itself may be capable of movement to position itself to better track subject 130.

Figure 2:
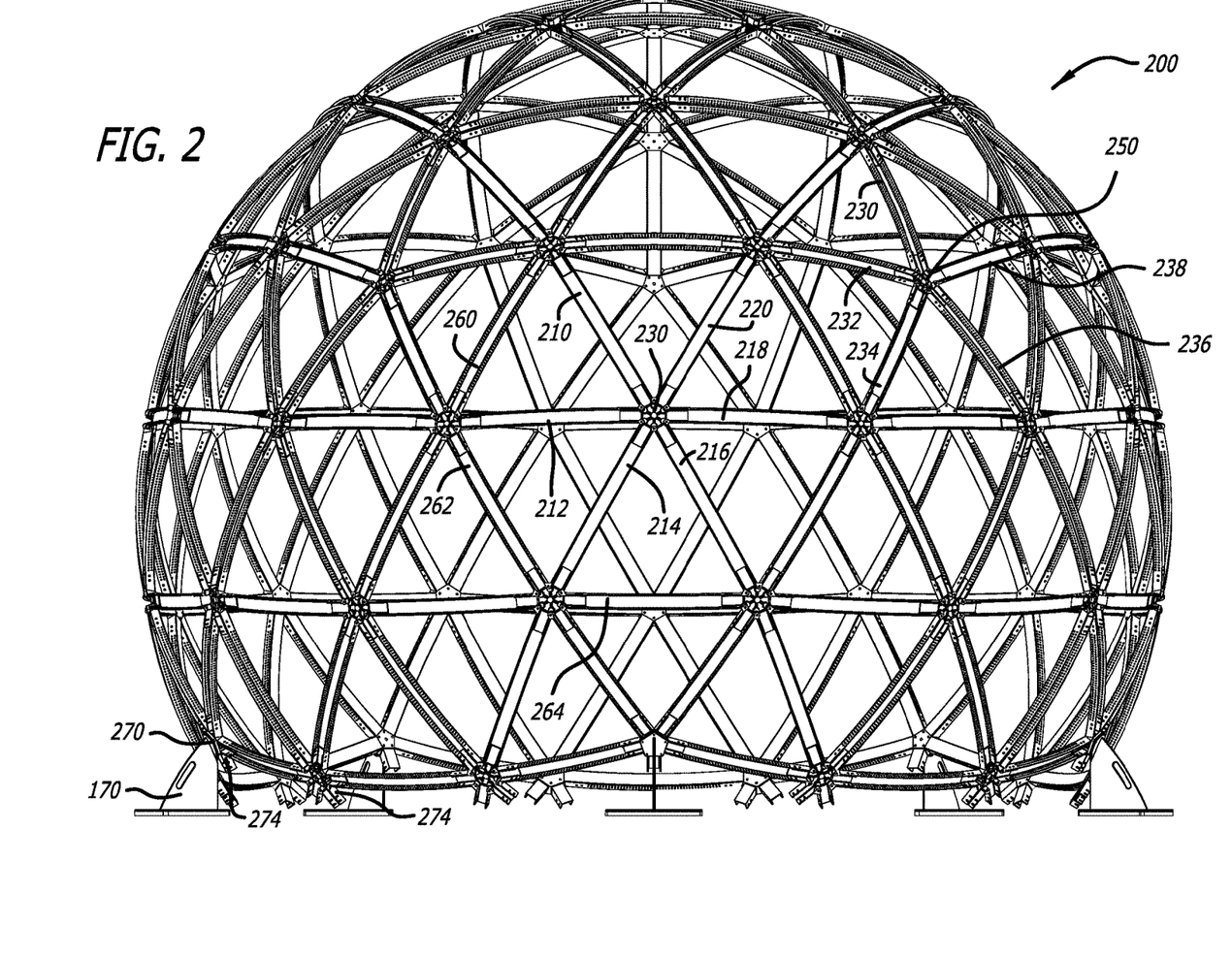
FIG. 2 is a fully constructed versatile volumetric camera rig.

Turning to FIG. 2, a portion of a fully constructed versatile volumetric camera rig is shown.

As can be seen, the rig 200 may be composed of different sized arm component lengths combined with different types of joint components. For example, arm components 210, 212, 214, 216, 218 and 220, are all arm components of a particular length and are joined to hexagonal joint component 230. Meanwhile, arm components 230, 232, 234, and 236 are arm components of a different length and are also joined together by a pentagonal joint component 250. Additionally, arm components 260, 262, and 264 are of an even different length. Arm components 260, 262, and 264 can connect to both hexagonal or pentagonal joint components.

Stand component 170 may be attached to the rig via a connection between stand male face piece 270 of stand component 170 and female face piece 274 of any joint component. The connection is discussed more in FIG. 11.

Figure 3:
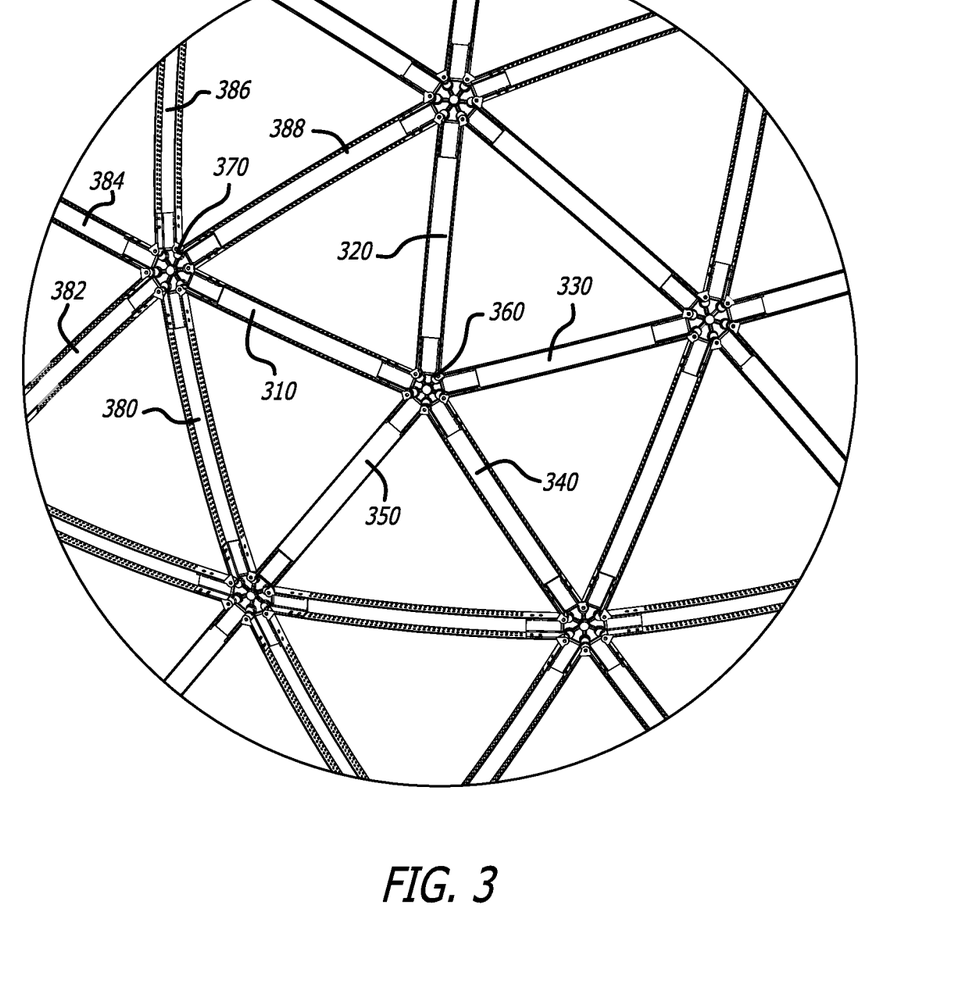
FIG. 3 is a detail view of a portion of a versatile volumetric camera rig.

Turning to FIG. 3, a detail view of a portion of a versatile volumetric camera rig is shown. FIG. 3 emphasizes the substructures formed from arm components and joint components. Arm component 310, 320, 330, 340, 350 may be joined together at joint component 360 to form a substructure made up of each of those arm components 310, 320, 330, 340, 350 and joint component 360. Joint 370 combining arm components 380, 382, 384, 386, and 388, but also formed from arm 310 forms another substructure. Gaps that are naturally formed by these various substructures may or may not be filled with a fixture, as discussed. Plexiglass or other materials such as plastic, glass, green or other color screens, wood, metal, mirror materials or screens such as LCD or OLED screens may be fastened to the rig to fill gaps, if a more uniform structure is desirable. For example, if a blue light is required for a scene, bluish plexiglass may be used to cover the sphere and backlighting used behind that plexiglass, thus creating a bluish tinge for the entire scene. Or, a blue LED light may be fixed in the gap to create the light effect directly. Reflective and shiny materials may also be used to fill in the triangle spaces for other lighting effects.

Figure 4A:
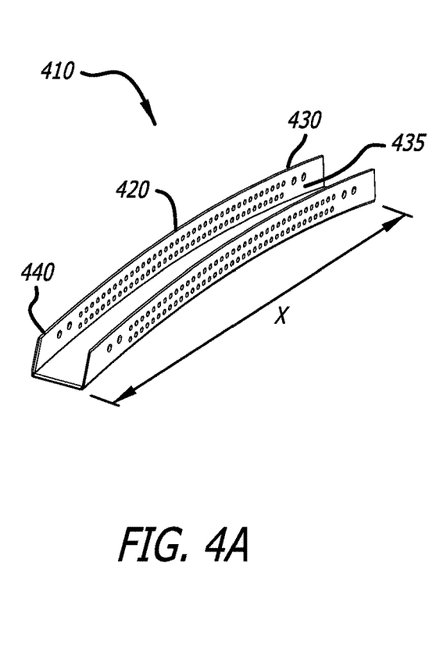
FIG. 4a is a side perspective of an arm component of a versatile volumetric camera rig.

Turning to FIG. 4*a*., a side perspective of an arm component of a versatile volumetric camera rig is shown. Arm component 410 contains a multitude of mounting points. Mounting point 420 is just one example of mounting points available on arm component 410. The mounting points are preferably holes capable of accepting a fastener and supporting fixtures attached to the rig. In some instances, the mounting points may contain threads in others they may not. Pins, shoulder screws, bolts, and other attachment systems may be configured to fasten items to the arm components. Additionally, the arm components and mounting points may be used to form a connection to form a quick release system in which the joint arm connection may be removed without the use of a bolt.

Arm component 410 may be outfitted with multiple mounting point patterns which consist of mounting points in different configurations. Top row 430 is one such configuration mounting point pattern while bottom row 435 may use a different configuration. Attachment point 440 is used to affix the arm component to joint components to form substructures and the overall rig structure. Arm components may have the same ¼ inch diameter through holes pattern but the number of holes on each arm may be varied or uniform. There can also be at least two circular hole patterns on the arm components, one 2485 mm away from a center point for the sphere with another circular hole pattern 2470 mm away from a center point for the sphere. Each hole on the same circular hole pattern may preferably be provided along each arm component every one third of a degree from a center point of the resulting partially spherical rig. The mounting points found on the arm components and joint components may also be spaced from each other at a distance of 1.5 cm from a center point of a mounting point to the next mounting point and the mounting points themselves may have a diameter of approximately a ¼ inch to suitably accommodate counterpart fasteners for any fixtures.

Fixtures, including cameras may be mounted on the arm components around a film a subject and environment inside the sphere. Other fixtures, including sensors besides cameras such as LIDAR sensors, proximity detectors, infrared, pyrometers, and photodetectors, may also be mounted on the arm components. Other items common to filming may be mounted on the arm components such as lights, fog machines, sound effect makers, microphones and speakers. Sometimes props or items an actor or subject may interact with can also be mounted on the arm components. For example, if a scene in which a mirror is being used by one of the actors is used, a mirror may be mounted on one of the arm components.

Items not necessary to filming but convenient for shooting on a set may also be stored on the arm components. For example, a director's clipboard, pouches, or other items can be fastened to the outside of the arm components for convenient storage on set.

In other instances, rails may be installed on the arm components, or the arm components and joint components may be used as rails themselves. These rails allow for the movement of cameras and other apparatuses around the sphere. In other versions, the rails may assist in the movement of objects inside the sphere to move around. For example, for some scenes, a fully immersive experience may not be needed, and a filmmaker may want to capture the perspective of one camera moving around the sphere (interior or exterior). For such a scene, the director may fasten the camera to the rails, and the camera may move around the sphere remotely. Any of these rails may mount to one or more of the mounting points 420, 430, 435 and the like.

The arm components are always slightly curved in such a way that when assembled with other arm components and joint components, the over all structure will maintain a spherical shape. The rounded arm components allow for accurate positioning of cameras and other sensors because each camera can be positioned in such a way to always point to the exact center of the environment being filmed. Rounded arm components are superior to straight arm components because a straight arm offsets camera relative distance to a center point (e.g. a subject) and may cause them to not point directly at the center of the sphere. This is not ideal because such positioning introduces imperfections in volumetric capture. But by keeping the arm components slightly rounded around a uniform center point, when combined with joint components the entire filming area is kept as a sphere which with enough cameras, allows for excellent 360° capture of a volumetric scene. Other systems using non-curved arm components for an overall non-roundarm component shape are not ideal because when such unrounded arm components are combined with a joint, they create perpendicular junctions. Such junctions are either awkward to support a camera or cannot support a camera. Worse yet, the image taken from such a juncture will negatively affect the volumetric capture experience. Additionally, when assembling such a structure from straight arm components, there is physically less volume in the space, and thus less room in which to place cameras. The modularity of the arm components (with several different lengths) is favorable because it allows for easy assembly and disassembly of the entire sphere, and for easier storage and transportation in limited space. The arm components may also be outfitted with uniform holes for mounting cameras, lights and other objects that need mounting for a scene.

Figure 4B:
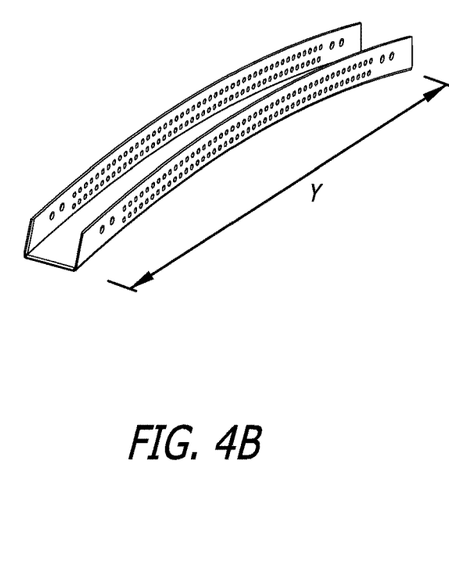
FIG. 4b is a side perspective of a different arm component of a versatile volumetric camera rig.
Figure 4C:
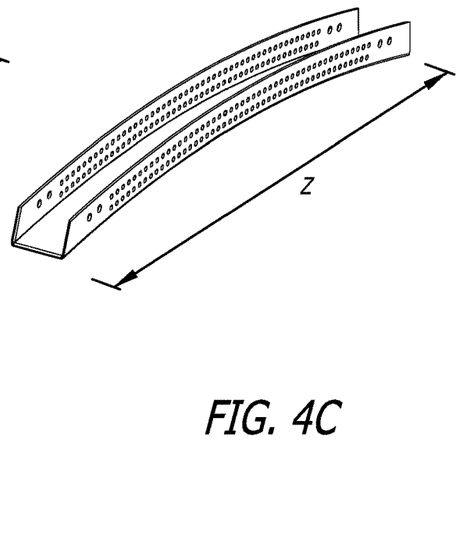
FIG. 4c is a side perspective of a different arm component of a versatile volumetric camera rig.

The arm components may come in different lengths. FIG. 4*b* is a different length than both FIGS. 4*a* and 4*c* while FIG. 4*c* is a different length than both FIG. The different lengths enable the arm components to be used in different configurations to create overall spherical structures. For example, as discussed more fully below, the arm components may be joined to six or five-sided joint components to create hexagonal or pentagonal shapes. Those shapes may be combined into overall structures. 4a and 4b. In FIGS. 4a, 4b, and 4c, the different lengths are denoted by the measurements x, y, and z. The lengths for x, y, and z may be 893.97 mm, 866.6 mm, 748.66 mm respectively.

In some instances, it may be favorable to keep the arm components all the same length and/or size. In other instances, different arm component lengths may be mix and matched to create a sphere. For example, in some instances the sphere may be constructed from small, medium, and large arm components. In other instances, arm components of a single uniform length may be used. Additionally, the arm components may be constructed with c-channels on their exterior (when mounted as a sphere) that allows cables to be hidden on the exterior of the dome when assembled (e.g. FIG. 5).

Figure 5:
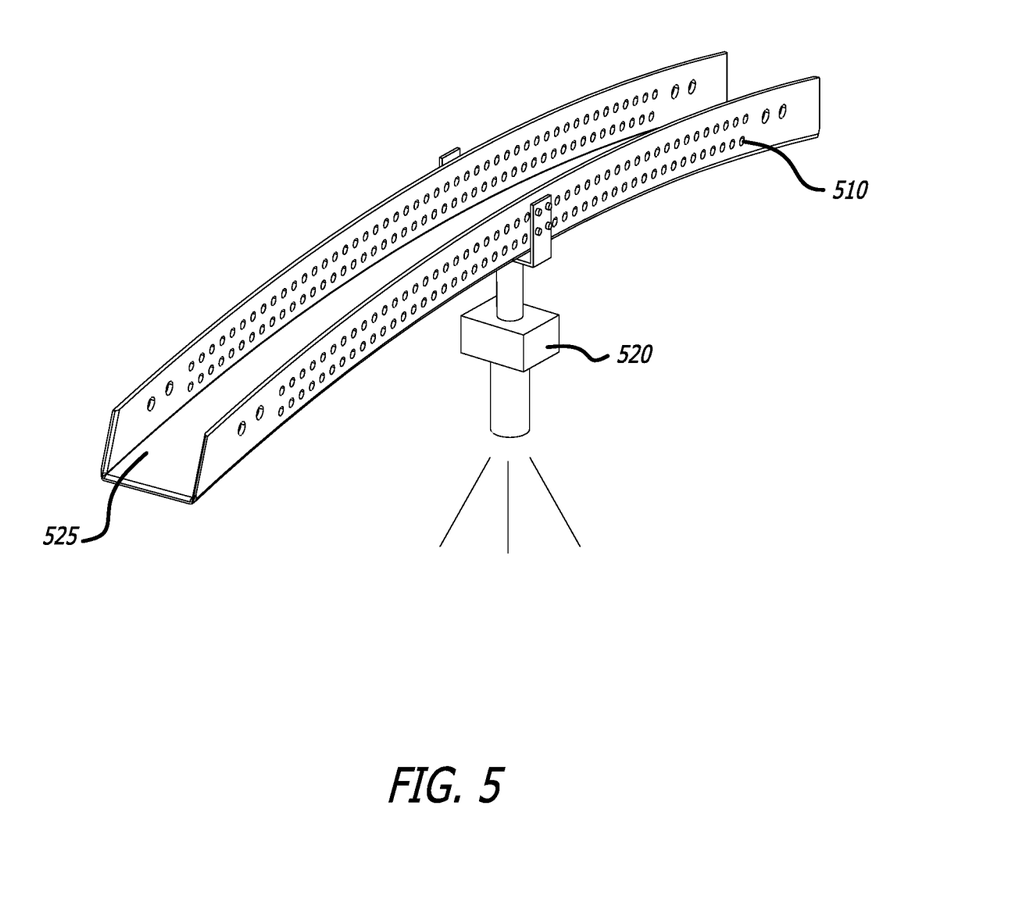
FIG. 5 is an angle perspective of an arm component of a versatile volumetric camera rig showing a fixture attached to the arm component.

Turning to FIG. 5 FIG. 5 is an angle perspective of an arm component 510 of a versatile volumetric camera rig showing a fixture 520 attached to the arm component 510.

The fixture 520 may be a camera or other sensor used in the filming process when the rig is used. However, the fixture 520 could be any number of items capable of being attached by using the mounting holes and patterns found on the arm component 510. For example, fixture 520 could be a battery pack for a camera, a pouch for storing items during filming, a network adapter, a mirror or any item used for filming that is capable of attachment. Channel 525 may be a C- or U-channel. Cables used for cameras or other fixtures may be stored in the channel.

The apparatuses mounted on these arm components 510 often require cables. For example, a camera may need to be plugged into an electrical source to obtain power. These cables can get in the way during filming, and if enough apparatuses are used on the arm components, the wires can become a tangled mess. By making the C-channel of the arm component deep enough, and on the outside of the sphere, such wires can be hidden within the C-channel and organized. In this way, all of the wires connecting the various fixtures, like fixture 520, may be hidden from the filming scene within the rig.

The arm components may have, for example, a 5 meter radius in order to align the mounting points. The mounting point alignment may be targeted to the center of the sphere. Each arm component may also have an outward facing C-channel structure for the user to use for better cable management or to mount accessories. The sides of the arm components based on their relation to whether they face the scene or not (e.g. side that faces scene, side that does not face scene, upper side, lower side) may be color coded (and a suitable paint or die may be used on the arm component) to better assist operators of the rig. This helps the operator locate areas with more ease and assists in assembling, taking apart, and maintaining the rig and scene. For example, every other side of the arm which can be seen from the center of the stage may be colored in black or green.

Figure 6:
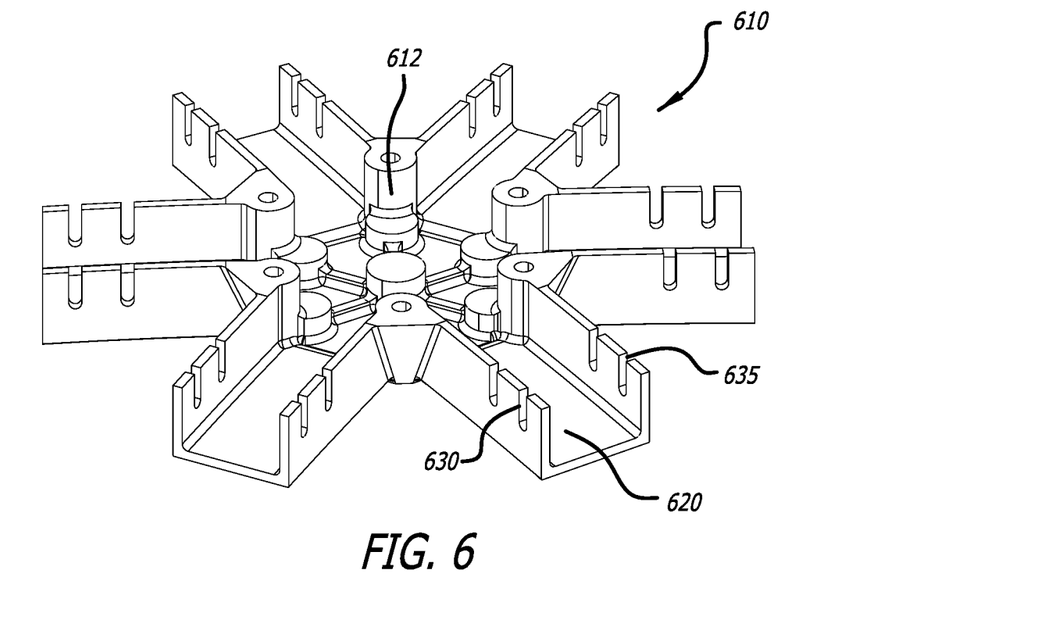
FIG. 6 is a hexagonal joint component.

Turning to FIG. 6, a hexagonal joint component 610 is shown.

The hexagonal joint component 610 is a hexagonal joint component because there are six terminals each of which may join with an arm component. Terminal 620 and all the other terminals may contain grooves used for fitting arm components to the joint components. In FIG. 6 attachment grooves 630 and 635 are parallel to one another. This is because a fastener may be fitted between joint component 630 and 635, and then bolts may be used to fasten the arm component (for example, at attachment point 440 in FIG. 4) to the joint component. Pins and shoulder screws may also be used as fasteners. Female face piece 612 may also be used to connect stand component or other items to the rig (see FIG. 11, below).

Figure 7:
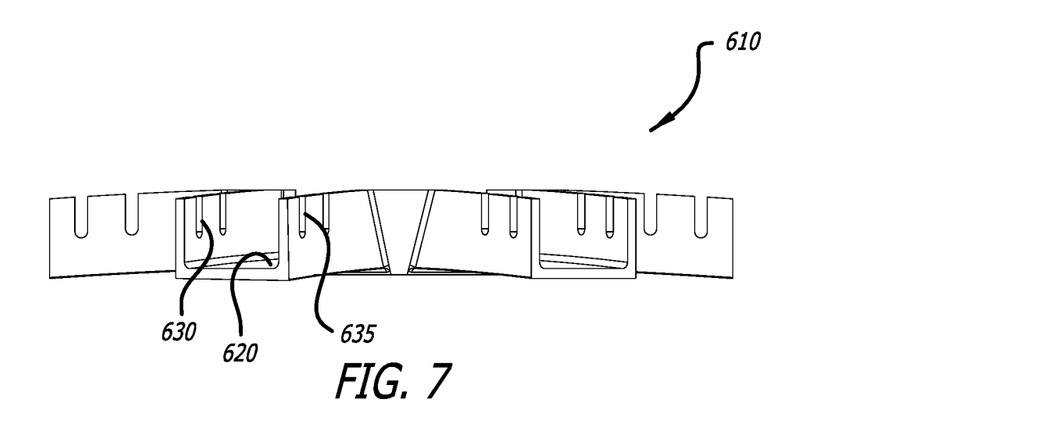
FIG. 7 is an elevation view of a hexagonal joint component.

FIG. 7 is an elevation view of a hexagonal joint component 610. FIG. 7 gives a closer and different perspective of groove 630 and 635 as well as terminal 620. As can be seen, the attachment grooves are not holes, but are channels through which bolts or other fasteners may be passed. Additionally groove 630 and 635 are designed to enable easy milling by a computer numerical control milling machine or more recent metal 3D printers. Specifically, an arm component or joint component need only be rotated once along an axis during the milling/manufacturing process. Furthermore, this structure enables faster take down and construction of the overall rig. This is advantageous over similar rigs which may be fixed together in large components (e.g. welded) or those that rely upon straight arm components, for the reasons discussed above. The arm components may also Integrate and connect with various different lengths of terminal 620.

Figure 8:
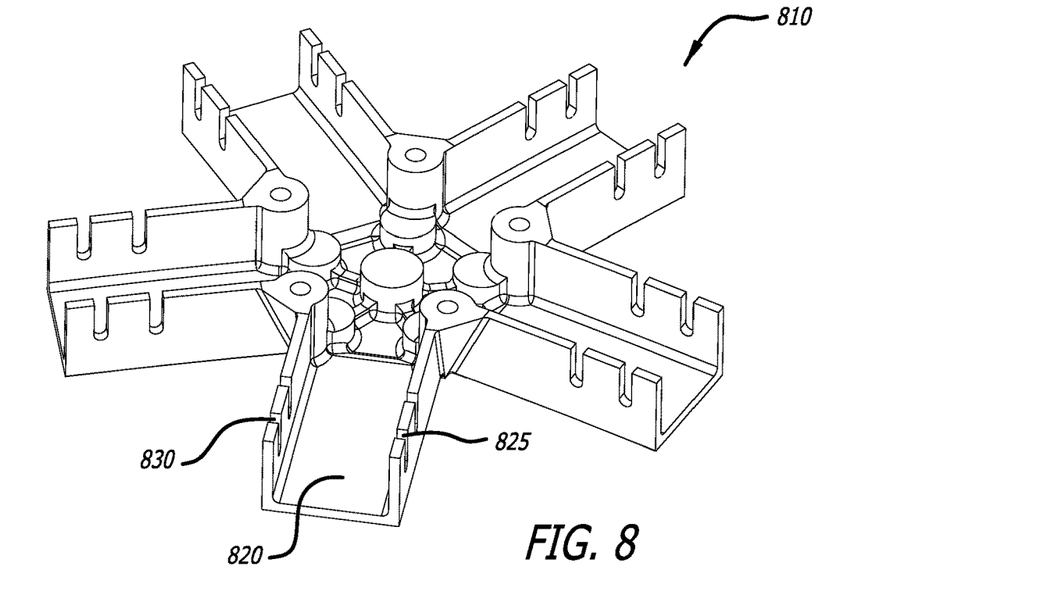
FIG. 8 is a pentagonal joint component.

FIG. 8 is a pentagonal joint component 810.

Pentagonal joint component 810 is composed of five terminals. Terminal 820 may contain attachment grooves 825 and 830. Grooves 825 and 830 are capable of accepting fasteners used in attaching arm components. In FIG. 8, the grooves are parallel from one another but may also not be parallel from one another in some cases.

Figure 9:
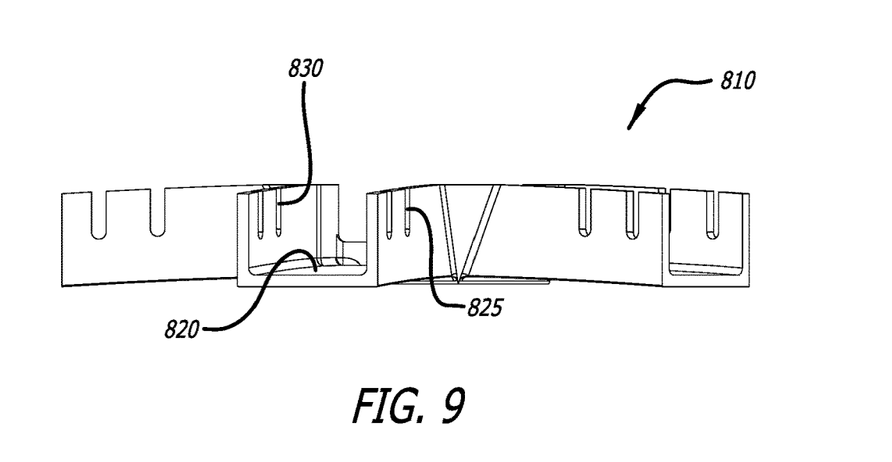
FIG. 9 is an elevation view of a pentagonal joint component.

FIG. 9 is an elevation view of a pentagonal joint component.

The perspective view contains a different view of grooves 825 and 830 as well as terminal 820. Here, the overall view of the grooves corresponds to that described with reference to FIG. 7.

Figure 10:
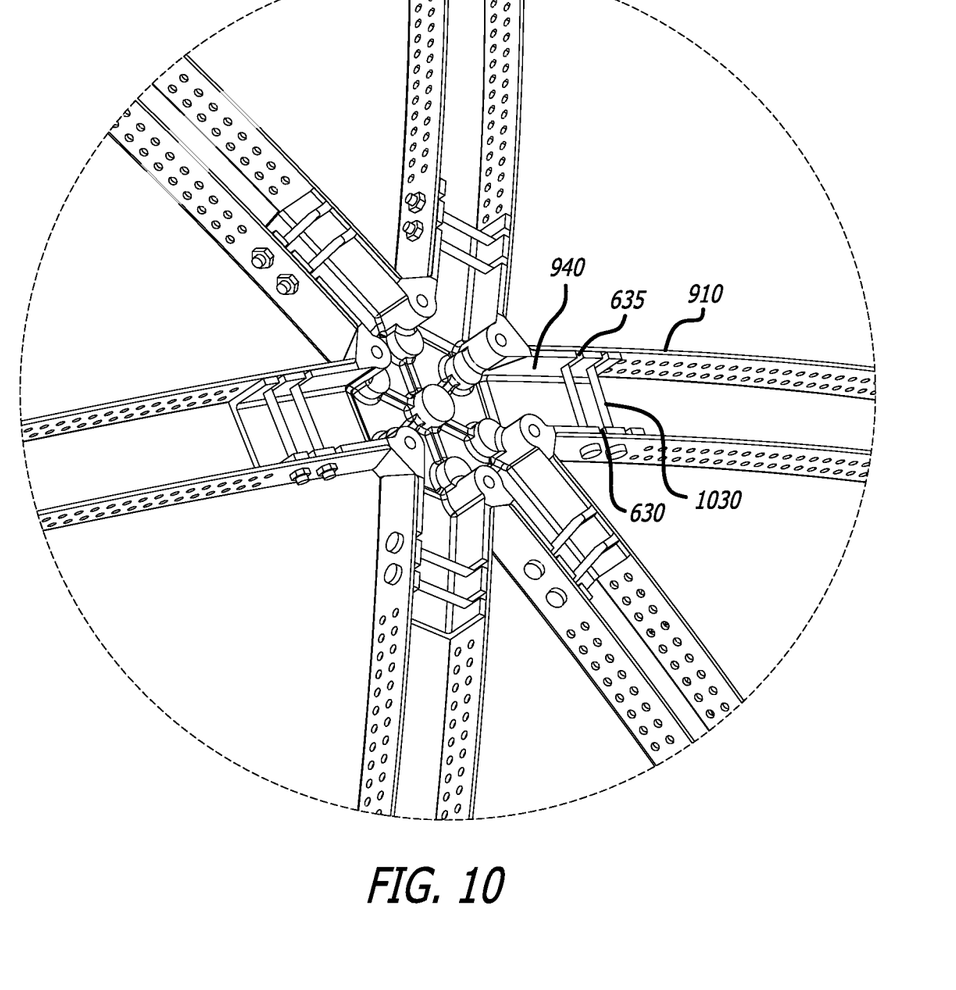
FIG. 10 is a detail view of a quick release system used to attach an arm component to a joint component.

FIG. 10 is a detail view of a connection between a joint component and arm component used to attach an arm component 910 to a joint component 940.

Fastener 1030 may be used to join arm component 910 with joint component 940. Fastener 1030 passes through joint groove 630 and 635 and a mounting point of arm component 910. The arm component in FIG. 10 continues upwards and overlays the joint component while in this attached configuration. Multiple fasteners may be used to ensure stability of the overall rig particularly because the fixtures and cabling may be heavy particularly when numerous cameras are used.

Figure 11:
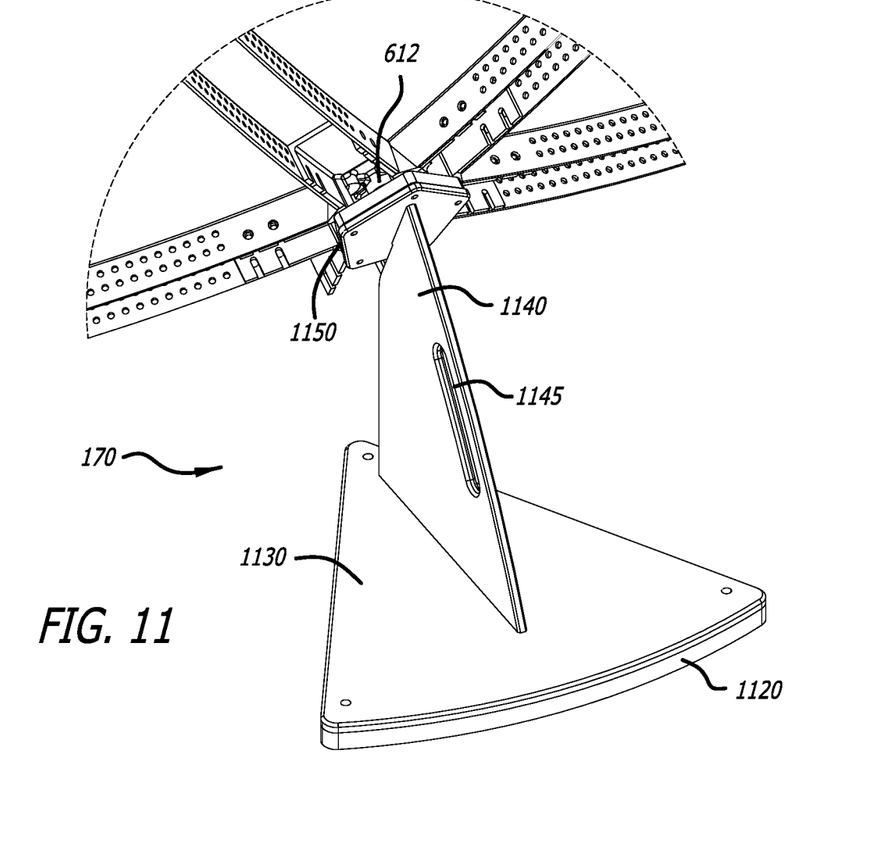
FIG. 11 is a perspective view of a stand component.

FIG. 11 is a perspective view of a stand component 170. Stand component 170 may be fitted to the bottom of the overall rig. Stand component 170 contains a base piece 1130 that may have a base bottom 1120. The base bottom 1120 may be made of foam, anti-slip, or a cushion material or be an additional portion of base piece 1130. Stand component 170 may also include neck 1140 and include a passthrough 1145. Passthrough 1145 may be used to mount other fixtures or to pass through cabling such as wires. Passthrough 1145 may not be needed or be applied to other parts of the neck or even the base. The passthrough may also be used as a grasp point for easier handling during assembly or movement of the entire rig. Finally, base piece 1130 also contains male face piece 1150. Male face piece 1150 may be complimentary to a female face piece of a hexagonal or pentagonal joint component. When male face piece 1150 is inserted into the female face piece (e.g. 612 from FIG. 6) of a joint component, the two create an attachment. In other instances, the male face piece may be replaced with threading and the female face piece of a joint replaced with complimentary threading. Still in other instances the two face pieces may be joined by other supplemental fasteners such as screws and bolts similar to how auxiliary pieces are joined to the arm components. In other instances, the female face piece and male face piece may both be magnetic which further aids in fastening the pieces together. Regardless, the male and female face pieces integrate to secure the stand component 170 to the rig.

Figure 12:
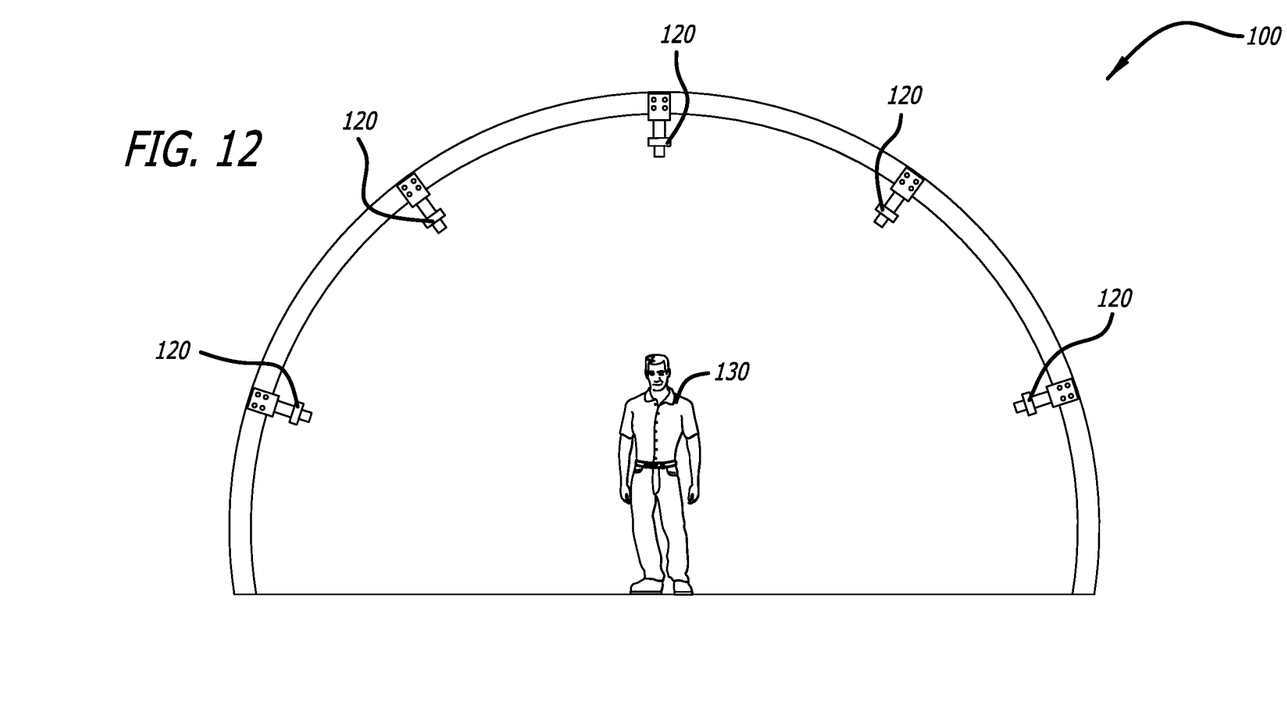
FIG. 12 is an interior, elevation view of a volumetric camera rig.

FIG. 12 is an interior, elevation view of a volumetric camera rig 100. Here, there are multiple fixtures 120 attached to the rig 100. Fixtures 120 are focused on an interior subject 130, however in other embodiments there may be more cameras, or the cameras may not be fixed on subject 120. The fixtures 120 are uniformly distributed around the volumetric camera rig 100, which, as discussed above, assists in the creation of volumetric video by simplifying the overall mathematics required and ensuring adequate overlap of captured images. In addition, the placement of the fixtures 120 may be seen to be along a semicircular path, rather than irregularly along straight lines making up a structure that is typical of the prior art. Again, the placement of the fixtures 120 along such a path simplifies the mathematics making the resulting volumetric video of a higher quality.

Figure 13:
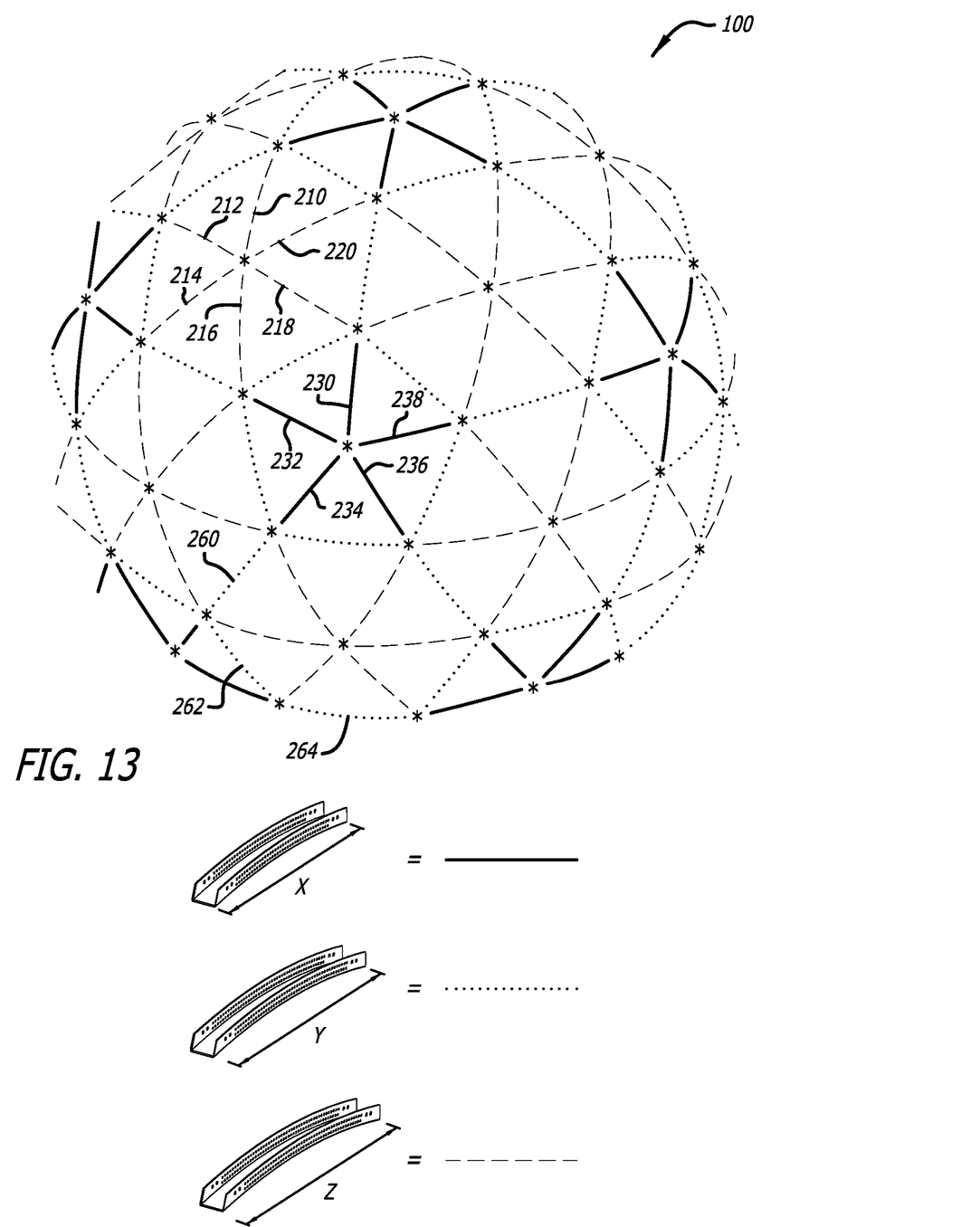
FIG. 13 is a view of an overall structure of a volumetric camera rig showing curvature of the arm components.

FIG. 13 is a view of an overall structure of a volumetric camera rig 100 showing curvature and length of the arm components. This view shows how arms may be composed of different lengths and measurements. Arm components 210, 212, 214, 216, 218 and 220, are all arm components of a particular length. Meanwhile, arm components 230, 232, 234, 236, and 238 are arm components of a different length. Additionally, arm components 260, 262, and 264 are of an even different length. Arm components 260, 262, and 264 can connect to both hexagonal or pentagonal joint components.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A versatile volumetric camera rig comprising:
   an at least partially spherical structure formed by the combination of a plurality of substructures;
   the plurality of substructures comprising a plurality of arm components with at least one end and joint components with at least one end;
   the arm components comprising an elongated, curved length of curved along an arc centered on a center point of the at least partially spherical structure and including a plurality of mounting points for fastening other objects to the at least partially spherical structure;
   a set of the plurality of arm components joined together by at least one joint component to form a substructure by attaching at least a part of an arm component to at least a part of a joint component;
   a series of arm components selected from a first group of substructures attached to a series of joint components selected from a second group of substructures;
   wherein at least one arm component contains a plurality of mounting points tangential to an exterior surface of the partially spherical structure and capable of accepting at least one fastener;
   wherein the ends of the arm components further comprise at least two open grooves for the insertion of fasteners;
   wherein the ends of the joint components further comprise at least two open grooves complementary to the grooves on the ends of the arm components with the grooves open in a direction perpendicular to the exterior of the at least partially spherical structure;
   wherein an arm component and a joint component may be attached to each other through the use of a fastener and a mounting point on a joint component and a mounting point on an arm component.

2. The versatile volumetric camera rig of claim 1 wherein the substructure comprises a hexagonal structure;
   the hexagonal structure further comprising a joint with at least six ends;
   each end further configured to accept at least one part of an arm component.

3. The versatile volumetric camera rig of claim 1 wherein at least one mounting hole is used to mount a camera, sensor, light or fixture.

4. The versatile volumetric camera rig of claim 1 wherein at least one of the arm components contains a back side with a U or C shaped groove;
   wherein the plurality of mounting points is found on the exterior of the U or C;
   wherein a cavity formed by the U or C is capable of storing cords.

5. The versatile volumetric camera rig of claim 1 wherein a mounting point pattern is either 2470 mm, 2485 mm, or 2500 mm away from the center of an arm curvature.

6. The versatile volumetric camera rig of claim 1 wherein pins and shoulder screws are configured at at least one joint arm connection to form a quick release system in which the joint arm connection may be removed without the use of unscrewing a bolt.

7. A method of constructing a versatile volumetric video camera rig comprising:
   forming a at least partially spherical structure by combining a plurality of arm components, each with a plurality of mounting points, two ends, and a curve along a circular arc centered around a center point of the partially spherical shape, with a plurality of joint components, each with a plurality of mounting points and six ends capable of accepting a portion of an arm component, each of the plurality of joint components curved in a manner corresponding to the curve of the plurality of arm components along the circular arc centered around the center point of the partially spherical shape;

forming from the combination of arm components and the plurality of joint components a plurality of combination structures, each comprising one joint component connected to at least four of the plurality of arm components via a connection between an end of one of the plurality of arm components and one end of the one joint component, and a fastener affixing the one of the plurality of arm components and the one joint component;

joining the combination structures together until the at least partially spherical structure has been constructed;

wherein at least one arm component contains a plurality of mounting points tangential to an exterior surface of the partially spherical structure and capable of accepting at least one fastener;

wherein the ends of the arm components further comprise at least two open grooves for the insertion of fasteners;

wherein the ends of the joint components further comprise at least two open grooves complementary to the grooves on the ends of the arm components with the grooves open in a direction perpendicular to the exterior of the at least partially spherical structure;

wherein an arm component and a joint component may be attached to each other through the use of a fastener and a mounting point on a joint component and a mounting point on an arm component.

8. The method of claim 7 wherein the substructure comprises a hexagonal structure;

the hexagonal structure further comprising a joint with at least six ends;

each end terminal further configured to accept at least one part of an arm component.

9. The method of claim 7 wherein at least one mounting hole is used to mount a camera, sensor, light or fixture.

10. The method of claim 7 wherein at least one of the arm components contains a back side with a U or C shaped groove;

wherein the plurality of mounting points is found on the exterior of the U or C;

wherein a cavity formed by the U or C is capable of storing cords.

11. The method of claim 7 wherein the mounting points found on the arm and joint components are spaced from each other at a distance of 1.5 cm from a center point of a mounting point to the next mounting point and the mounting point itself has a diameter of about a ¼ inch.

12. The method of claim 7 wherein a mounting point pattern is either 2470 mm, 2485 mm, or 2500 mm away from the center of an arm curvature.

13. The method of claim 7 wherein pins and shoulder screws are configured at at least one joint arm connection to form a quick release system in which the joint arm connection may be removed without the use of unscrewing a bolt.

14. A versatile volumetric camera rig comprising:

an at least partially spherical structure formed by the combination of a plurality of substructures;

the plurality of substructures comprising a plurality of arm components with at least one end and joint components with at least one end;

the arm components comprising an elongated, curved length of curved along an arc centered on a center point of the at least partially spherical structure and including a plurality of mounting points for fastening other objects to the at least partially spherical structure;

a set of the plurality of arm components joined together by at least one joint component to form a substructure by attaching at least a part of an arm component to at least a part of a joint component;

a series of arm components selected from a first group of substructures attached to a series of joint components selected from a second group of substructures;

wherein the mounting points found on the arm and joint components are spaced from each other at a distance of 1.5 cm from a center point of a mounting point to the next mounting point and the mounting point itself has a diameter of about a ¼ inch.

* * * * *